United States Patent
Genest

(10) Patent No.: US 8,384,306 B2
(45) Date of Patent: Feb. 26, 2013

(54) REGULATED CHARGE PUMP AND METHOD THEREFOR

(75) Inventor: Pierre Andre Genest, Lafitte Vigordane (FR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 983 days.

(21) Appl. No.: 11/916,508

(22) PCT Filed: Jan. 17, 2006

(86) PCT No.: PCT/US2006/001326
§ 371 (c)(1),
(2), (4) Date: Dec. 4, 2007

(87) PCT Pub. No.: WO2007/084115
PCT Pub. Date: Jul. 26, 2007

(65) Prior Publication Data
US 2008/0224627 A1  Sep. 18, 2008

(51) Int. Cl.
*H05B 37/02* (2006.01)
(52) U.S. Cl. .............. 315/307; 315/209 R; 315/224; 315/291

(58) Field of Classification Search .............. 315/172, 315/209 R, 224, 225, 291, 307; 363/59–62
See application file for complete search history.

(56) References Cited

U.S. PATENT DOCUMENTS

| | | | | |
|---|---|---|---|---|
| 5,113,120 A * | 5/1992 | Scott et al. | ...................... | 315/77 |
| 6,400,210 B2 * | 6/2002 | Myono | ........................ | 327/536 |
| 6,486,726 B1 * | 11/2002 | Worley et al. | .................. | 327/514 |
| 6,642,775 B2 * | 11/2003 | Imamiya | ...................... | 327/536 |
| 6,873,203 B1 * | 3/2005 | Latham et al. | ................ | 327/538 |
| 7,271,642 B2 * | 9/2007 | Chen et al. | .................... | 327/514 |
| 7,397,299 B2 * | 7/2008 | Ki et al. | ........................ | 327/536 |

* cited by examiner

*Primary Examiner* — Jimmy Vu
(74) *Attorney, Agent, or Firm* — Robert F. Hightower

(57) ABSTRACT

In one embodiment, a charge-pump controller is formed to control a value of current supplied to a load. One embodiment of a method of forming a charge pump controller may include configuring no more than three alternately switched switches of the charge pump controller to couple to a capacitor wherein the no more than three alternately switched switches are configured to couple the capacitor in a charging configuration during a first time period and to couple the capacitor to supply a current to an LED during a second time period. Another embodiment of the method may include configuring the charge pump controller to receive a sense signal that is representative of the current and to regulate the current, substantially to a first value.

9 Claims, 4 Drawing Sheets

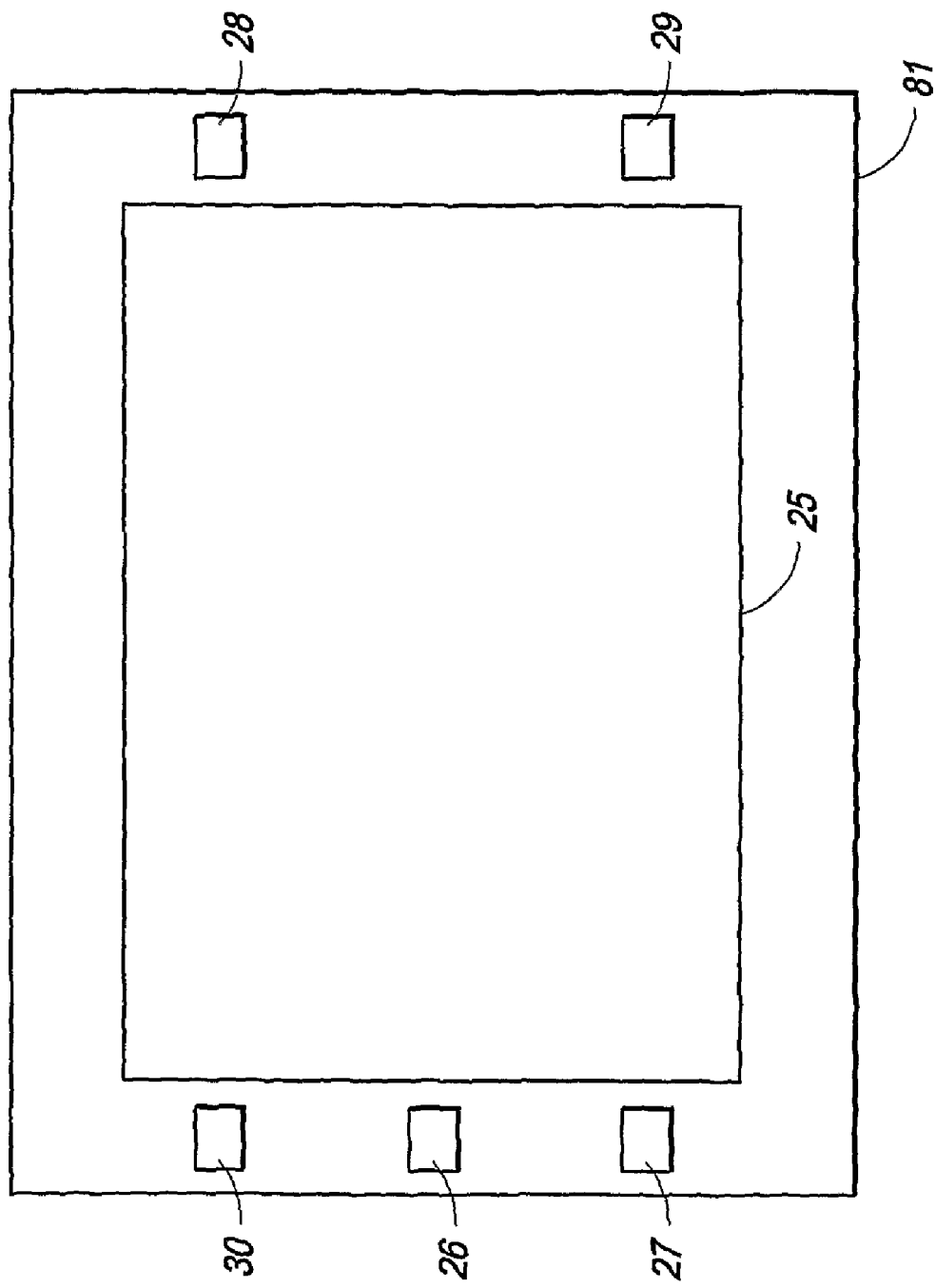

US 8,384,306 B2

REGULATED CHARGE PUMP AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to form switched capacitor step-up voltage circuits. One example of such a step-up voltage circuit was a charge-pump circuit such as a voltage doubler circuit. The voltage doubler generally used a capacitor that was alternately charged to a voltage and then coupled in series with the input voltage to power a load. In most applications, the voltage doubler used four transistors configured as two transistor pairs that were alternately switched to provide the desired charging of the capacitor. In some cases, the voltage doubler included a feedback loop that was used to set the value of the output voltage formed by the voltage doubler.

In some cases when the voltage doubler was used to regulate current, it was difficult to obtain good regulation, low pin count, and low cost with one single circuit charge-pump circuit. These three parameters generally were traded off against one another in order to achieve either low-cost, accurate regulation, or low pin count.

Accordingly, it is desirable to have a charge-pump circuit that has low pin count, that has a low cost, and that provides accurate regulation.

BRIEF DESCRIPTION OF THE DRAWINGS

FIG. 4 schematically illustrates an enlarged plan view of a semiconductor device that includes the charge-pump controller of FIG. 1 in accordance with the present invention.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action.

DETAILED DESCRIPTION OF THE DRAWINGS

Figure 1:
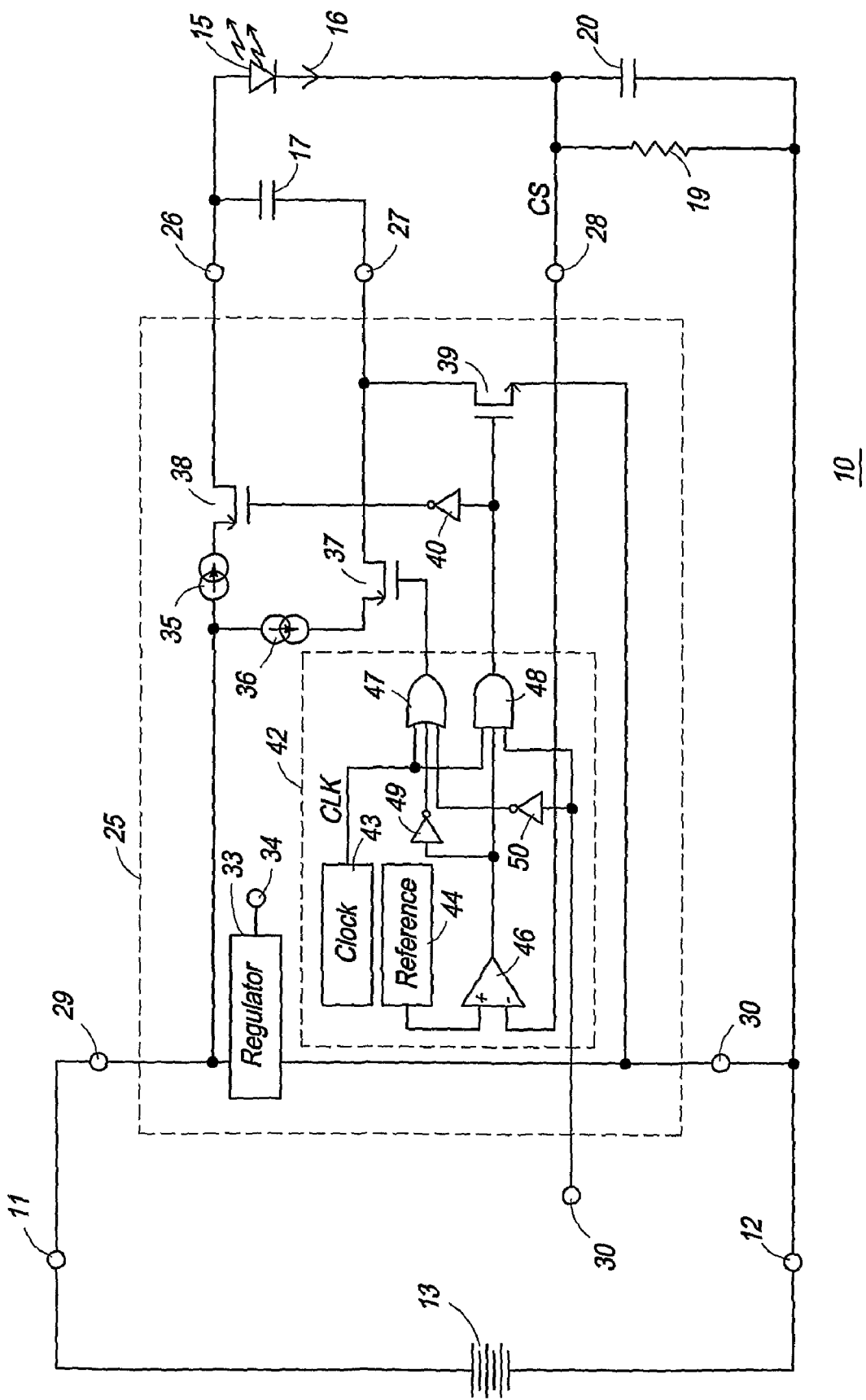
FIG. 1 schematically illustrates an embodiment of a portion of a charge-pump system having a charge-pump controller in accordance with the present invention.

FIG. 1 schematically illustrates a portion of an embodiment of a charge pump system 10 that includes an exemplary form of a charge pump controller 25. Controller 25 generally is configured to use no greater than six external terminals in order to control the charging and discharging of a capacitor and to supply current to a load. Controller 25 is also configured to regulate the value of the current supplied to the load to a first value. System 10 includes a voltage source 13, a pump capacitor 17, an averaging capacitor 20, a load such as a light emitting diode (LED) 15, and a feedback resistor 19. Voltage source 13 typically is a battery but may be a differ type of voltage source in other embodiments. Voltage source 13 supplies power to system 10 through a power input 11 and a power return 12. System 10 may include other elements that may be connected to input 11 and return 12, however, such other circuits are not shown in FIG. 1 for clarity of the drawings. Charge pump controller 25 receives an input voltage from source 13 between a voltage input terminal 29 and a common return terminal 30. Terminals 29 and 30 typically are connected to respective input 11 and return 12.

Controller 25 typically includes an internal regulator 33, a control circuit 42, a current source 35, a current source 36, and a plurality of capacitor switches that include a first transistor 37, a second transistor 38, and a third transistor 39. Regulator 33 generally is connected between terminals 29 and 30 to receive the input voltage and form an internal operating voltage on an output 34. The internal operating voltage from output 34 generally is used to operate other elements of controller 25, such as current source 36 and control circuit 42. Circuit 42 typically includes an oscillator or clock 43, a reference generator or reference 44, a comparator 46, and control logic that includes an OR gate 47, inverters 40, 49, and 50, and an AND gate 48. In some embodiments, controller 25 also includes an enable input 31 that receives an enable signal to enable and disable operation of controller 25. In some embodiments, regulator 33 may be omitted and power to operate controller 25 may be taken from terminal 29.

In operation, clock 43 generates a clock signal (CLK) having a substantially 50-50 duty cycle. The clock signal (CLK) being high represents one time period and CLK being low represents a second time period. During the first time period when CLK is high, capacitor 17 is charged to a voltage that is substantially the voltage of source 13. Assuming that the enable signal on enable input 31 is high and that the output of comparator 46 is high, when CLK goes high, the output of gate 47 goes high which disables transistor 37. The high from clock 43 forces the output of gate 48 is high which enables transistors 38 and 39. Enabling transistors 38 and 39 connects one terminal of capacitor 17 to the positive side of source 13 through transistor 38 and the other terminal of capacitor 17 to return 12 through transistor 39 thereby charging capacitor 17 to substantially the voltage of source 13. Current source 35 may be used to limit the maximum value of current through transistor 38 while charging capacitor 17. Note that some current may also be supplied to load 15 while capacitor 17 is charged. During the next time period when CLK goes low, capacitor 17 is connected in series with source 13 to supply a current 16 to LED 15. When CLK goes low, the output of gate 48 goes low which disables transistors 38 and 39, and the output of gate 47 goes low which enables transistor 37. Enabling transistor 37 couples one terminal of capacitor 17 to the positive side of source 13 through transistor 37 and current source 36. Thus, the value of the voltage applied to LED 15 is the voltage of source 13 plus the voltage stored on capacitor 17. The resulting voltage applied to LED 15 causes current 16 to flow from source 13 through current source 36 and capacitor 17 to LED 15. Current source 36 is configured to limit the maximum value of current 16 to a second value. Typically, the second value is set to be less than the maximum rated current of LED 15 in order to prevent damaging to LED 15. Current sources 35 and 36 may be formed as P-channel MOS transistors that have a constant reference voltage applied to the gate of the transistor in order to limit the maximum value of the current that flows through the transistor. In the preferred embodiment, current sources 35 and 36 are formed by limiting the maximum value of gate drive voltage that is applied to respective transistors 38 and 37 thereby limiting the maximum value of current trough the transistors. As current 16 flows through LED 15, current 16 also flows through sense resistor 19 and forms a voltage that is representative of the value of current 16. Capacitor 20 charges to a voltage that is substantially equal to the value of the voltage across resistor 19 thereby forming a sense signal that is received by controller 25 on a sense input 28. Capacitor 20 averages the value of the voltage across resistor 19 and forms the sense signal to representative of the average value of current 16.

Comparator 46 receives the sense signal from input 28, receives a reference signal from reference 44, and compares the value of the sense signal to the reference signal. If the value of the sense signal is less than the value of the reference signal, the output of comparator 46 is high which allows circuit 42 to continue operating to alternately charge capacitor 17 and to couple capacitor 17 to supply current 16. However, if the value of the sense signal is greater than the reference signal, the output of comparator 46 is low which disables circuit 42 and controller 25 from supplying current 16 to LED 15. If the output of comparator 46 is low, the output of inverter 49 is high and the output of gate 47 is high which disables transistor 37, and the output of gate 48 is low which disables transistors 38 and 39. Thus, comparator 46 and the sense signal facilitate controller 25 regulating the average value of current 16 to the first value. Typically, the average value of current 16 is less than the second value of current 16 that is limited by current source 36. Those skilled in the art will appreciate that capacitor 20 may be replaced by a filtering circuit internal to controller 25.

As can be seen, controller 25 uses only three switches that are alternately switched in order to alternately charge capacitor 17 and supply current 16. Using only three transistor switches facilitates minimizing the number of external connection terminals that are required by controller 25. For the embodiment where enable input 31 is omitted, using only three transistor switches facilitates controller 25 requiring no greater than five external connections or terminals. In one embodiment, controller 25 is formed as an integrated circuit on a semiconductor die. Using only three transistor switches facilitates forming the semiconductor die with no greater than five external terminals such as bonding pads on the semiconductor die. For the embodiment that includes enable input 31, controller 25 may be formed as an integrated circuit on a semiconductor die having no greater than six external terminals. Consequently, the semiconductor die may be assembled in a low-cost package having no greater than six pins. In prior art charge-pump controllers, and especially in prior art LED charge-pump controllers, the controllers regulate the value of the voltage supplied on the output of the charge-pump system and not the value of the current that is applied to load. Because the current through an LED varies as a function of the forward voltage across the LED, regulating the value of the voltage does not provide good regulation of the current through the LED. Using controller 25 to regulate the value of the current through the LED provides better control of the light emitted by the LED.

In order to facilitate this functionality for controller 25, terminal 29 is connected to a first terminal of regulator 33, a first terminal of source 36, and to a first terminal of source 35. A source of transistor 38 is connected to a second terminal of source 35. A drain of transistor 38 is connected to output 26. Output 26 is commonly connected to a first terminal of capacitor 17 and a first terminal of LED 15. A second terminal of LED 15 is connected to a first terminal of capacitor 20, a first terminal of resistor 19, and input 28. A second terminal of capacitor 20 is commonly connected to terminal 30, return 12, and a second terminal of resistor 19. A second terminal of capacitor 17 is connected to an output 27. A second terminal of regulator 33 is connected to terminal 30 and to a source of transistor 39. A drain of transistor 39 is commonly connected to output 27 and a drain of transistor 37. A source of transistor 37 is connected to a second terminal of source 36. An output of clock 43 is commonly connected to a first input of gate 47 and a first input of gate 48. The output of reference 44 is connected to a non-inverting input of comparator 46. An inverting input of comparator 46 is connected to receive the current sense signal from input 28. The output of comparator 46 is commonly connected to a second input of gate 48 and an input of inverter 49. An output of inverter 49 is connected to a second input of gate 47. Enable input 31 is commonly connected to a third input of gate 48 and an input of inverter 50. An output of inverter 50 is connected to a third input of gate 47. The output gate 47 is connected to a gate of transistor 37. The output of gate 48 is commonly connected to the gate of transistor 39 and an input of inverter 40. An output of inverter 40 is connected to the gate of transistor 38.

Figure 2:
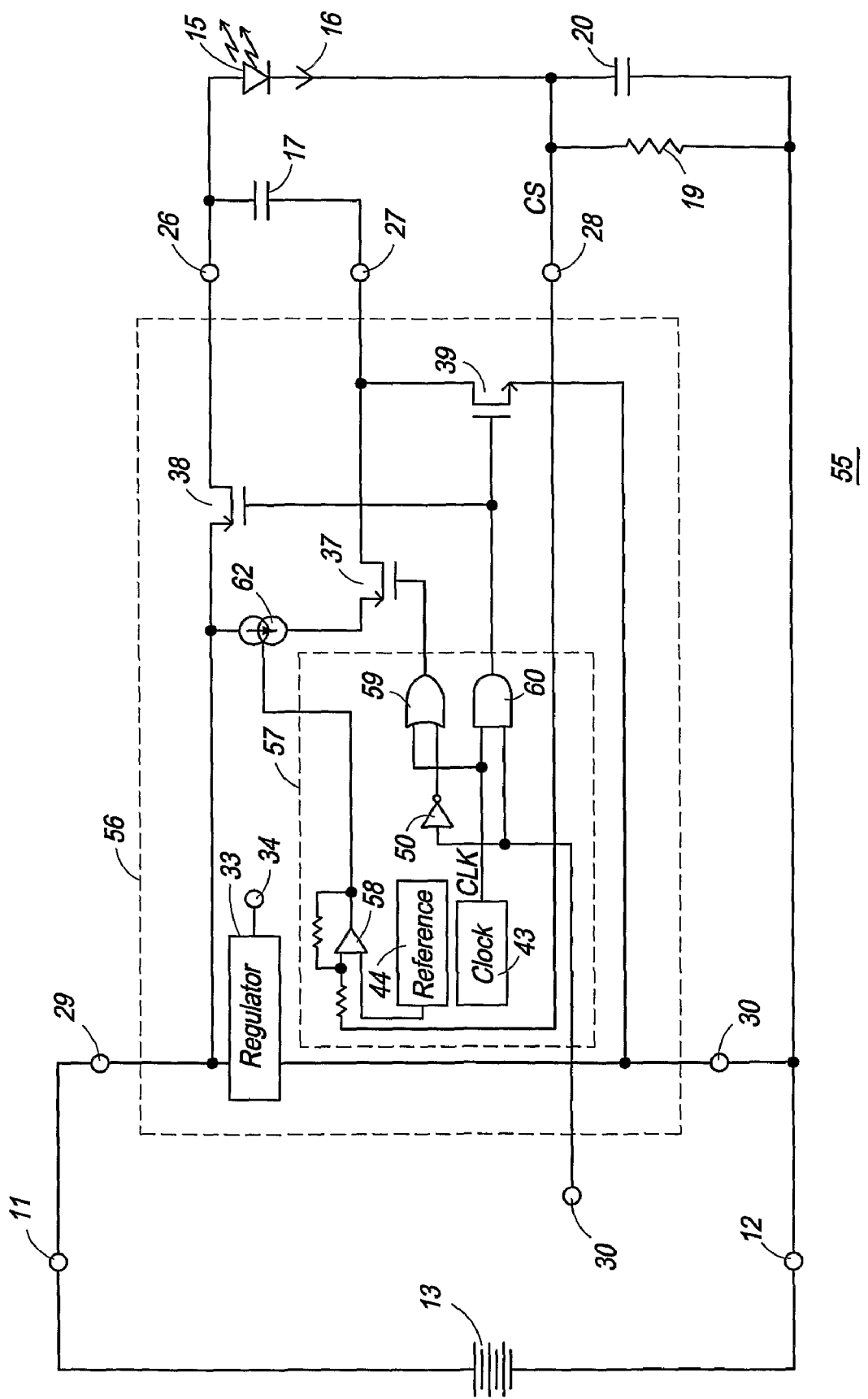
FIG. 2 schematically illustrates an embodiment of a portion of another charge-pump system having another charge-pump controller that is an alternate embodiment of the charge-pump controller of FIG. 1 in accordance with the present invention.

FIG. 2 schematically illustrates a portion of an embodiment of a charge pump system 55 that is an alternate embodiment of system 10 that was described in the description of FIG. 1. System 55 includes a charge-pump controller 56 having a control circuit 57 that are alternate embodiments of respective controller 25 and circuit 42 that were described in the description of FIG. 1. Controller 56 includes a variable current source 62 that supplies a current that is controlled by an external control signal supplied to source 62. Circuit 57 includes an error amplifier 58 instead of comparator 46. Amplifier 58 receives the sense signal and provides an error signal representing a deviation between the sense signal and the reference signal from reference 44. Circuit 57 also includes gates 59 and 60 that are similar to gates 47 and 48 but have fewer input signals. Circuit 57 is configured to receive the sense signal and regulate the value of current 16 to the first value by controlling the amount of current supplied by current source 62. Thus, controller 56 functions similarly to controller 25. However, instead of using comparator 46 to disable the switching of transistors 37, 38, and 39, the error signal from amplifier 58 is used to control the value of current supplied by source 62 thereby regulating the value of current 16. Variable current source 62 also limits the maximum value of current 16 to the second value similarly to current source 36.

Figure 3:
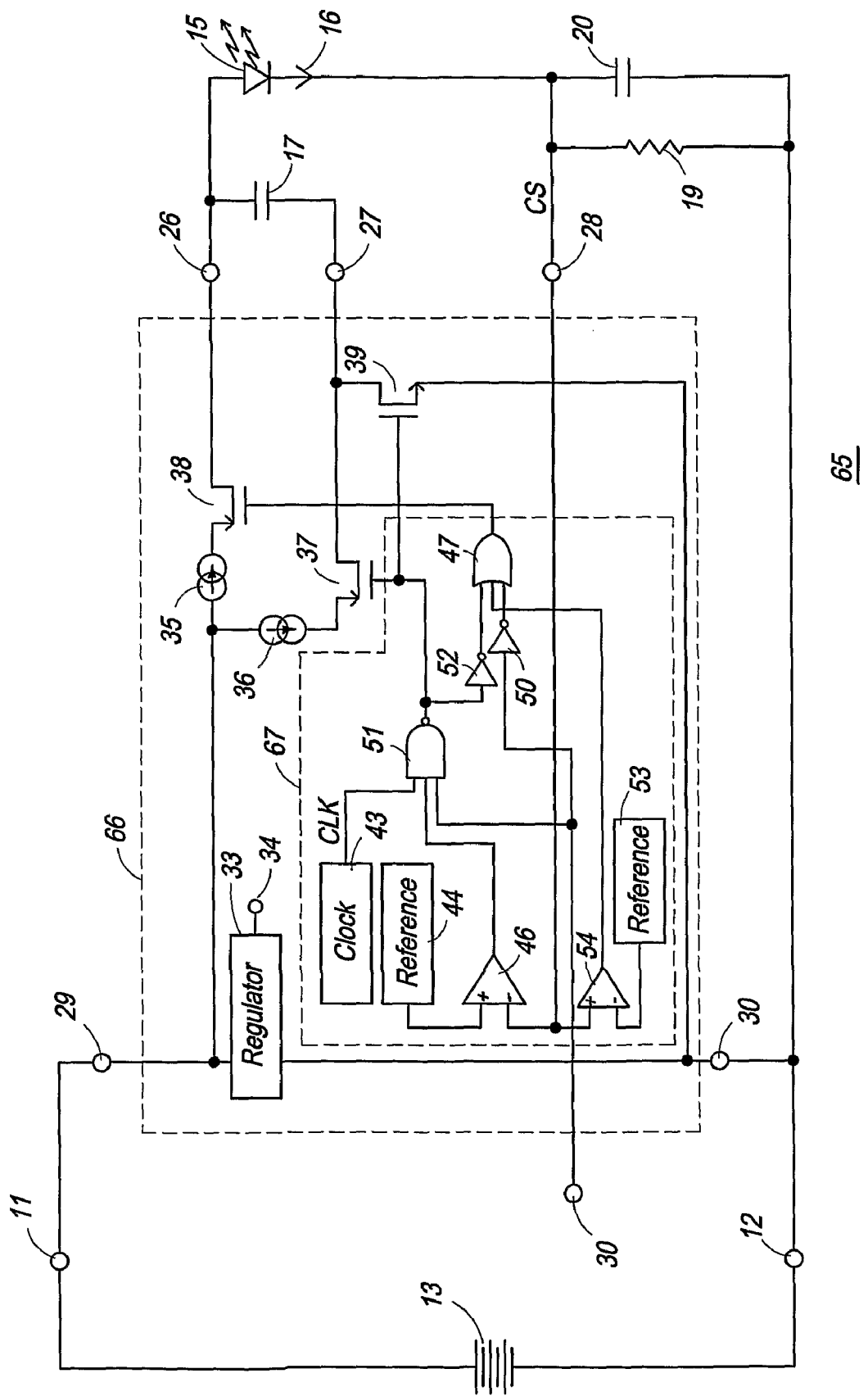
FIG. 3 schematically illustrates an embodiment of a portion of another charge-pump system having another charge-pump controller that is an alternate embodiment of the charge-pump controller of FIG. 1 in accordance with the present invention.

FIG. 3 schematically illustrates a portion of an embodiment of a charge pump system 65 that is an alternate embodiment of system 10 that was described in the description of FIG. 1. System 65 includes a charge-pump controller 66 having a control circuit 67 that are alternate embodiments of respective controller 25 and circuit 42 that were described in the description of FIG. 1. Circuit 67 includes a NAND gate 51, an inverter 52, a comparator 54, and a second reference voltage generator or reference 53 that forms a second reference voltage having a value that is greater than the reference voltage formed by reference 44. If the sense signal received from input 28 is greater than the first value, represented by the value of reference 44, and less than a second value, that is represented by the value of reference 53, then the output of comparator 46 is low and the output of comparator 54 is low. The low from comparator 46 and the low from comparator 54 force the output of gate 51 high to disable transistor 37 and to enable transistor 39. The high from gate 51 also forces the output of gate 47 low, through inverter 52, to enable transistor 38. Thus, transistors 38 and 39 are enabled so that some current flows from source 13 to load 15. If current 16 increases to a second value which causes the sense signal on input 28 to increase to greater than the second value represented by the output of reference 53, the output of comparator 54 goes high. The low from comparator 46 and the high from comparator 54 force the output of gate 51 high to disable transistor 37 and enable transistor 39. Disabling transistor 38 prevents current flowing to load 15 and allows capacitor 17 to discharge. If the sense voltage becomes less than the second value, then transistor 38 is re-enabled.

FIG. 4 illustrates an enlarged plan view of a portion of an embodiment of a semiconductor device or integrated circuit 80 that is formed on a semiconductor die 81. Controller 25 is formed on die 81. Die 81 may also include other circuits that are not shown in FIG. 3 for simplicity of the drawing. Controller 25 and device or integrated circuit 80 are formed on die 81 by semiconductor manufacturing techniques that are well known to those skilled in the art. In other embodiments, controller 55 or 65 may be formed on die 81.

In view of all of the above, it is evident that a novel device and method is disclosed. Included, among other features, is forming a charge-pump circuit that is configured to control the current supplied to the load to a first value. Also included is configuring no more than three transistor switches to couple to capacitor 17 and alternately couple capacitor 17 in a charging configuration and in a configuration to supply current 16. Using only three transistor switches also facilitates having a sense input and still having no more than six external connections to controller 25.

While the subject matter of the invention is described with specific preferred embodiments, it is evident that many alternatives and variations will be apparent to those skilled in the semiconductor arts. Those skilled in the art will appreciate that LED 15 may be replaced with any type of load that also allows current 16 to flow in only one direction. For example, the load may be a diode or other type of circuit having a diode in series therewith. When the load is an LED, charge-pump controller 25 functions as an LED controller. Further, the logic of circuits 42 and 57 may be replaced with other logic circuits. The logic circuits may also include other logic to ensure non-overlapping operation for circuits 42 and 57. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A method of forming a charge pump controller comprising:
configuring no more than three alternately switched switches of the charge pump controller to couple to a capacitor including configuring at least one current carrying electrode of each of the no more than three alternately switched switches to be connected to at least one plate of the capacitor wherein the no more than three alternately switched switches are configured to couple the capacitor in a charging configuration during a first time period and to couple the capacitor to supply a current to an LED during a second time period;
coupling a first transistor, as a first switch of the no more than three alternately switched. switches, between a first output of the charge pump controller and a supply voltage input of the charge pump controller wherein the first output is configured to be coupled to a first plate of the capacitor and to a first terminal of the LED; and
coupling a second transistor, as a second switch of the no more than three alternately switched switches, between a second output of the charge pump controller and the supply voltage input wherein he second output is configured to be coupled to a second plate of the capacitor.

2. The method of claim 1 further including forming the charge pump controller on a semiconductor die wherein the capacitor and the LED are external to the semiconductor die.

3. The method of claim 2 wherein forming the charge pump controller on the semiconductor die includes forming the charge pump controller on the semiconductor die having no more than six external connection terminals.

4. The method of claim 1 further including configuring the charge pump controller to receive a sense signal that is representative of the current and to regulate the current substantially to a first value.

5. A method of forming a charge pump controller comprising:
configuring no more than three alternately switched switches of the charge pump controller to couple to a capacitor wherein the no more than three alternately switched switches are configured to couple the capacitor in a charging configuration during a first time period and to couple the capacitor to supply a current to a load during a second time period including configuring a first transistor, as a first switch of the no more than three alternately switched switches, to be enabled to couple a first plate of the capacitor to receive an input voltage and configuring a second transistor, as a second switch of the no more than three alternately switched switches, to be enabled to couple a second plate of the capacitor to a return to couple the capacitor in the charging configuration during the first. time period; and
configuring the first transistor, the second. transistor, and a third transistor, as a third switch of the no more than three alternately switched switches, to couple the capacitor to supply the current to the load during the second time period.

6. The method of claim 5 further including configuring the charge pump controller to couple the capacitor to supply the current to the load that is an LED.

7. The method of claim 5 further including coupling the first transistor between a first output of the charge pump controller and the input voltage wherein the first output is configured to be coupled to the first plate of the capacitor; and
coupling the second transistor between a second output of the charge pump controller and the input voltage input wherein the second output is configured to be coupled to the second plate of the capacitor.

8. A method of forming a charge pump controller comprising:
configuring no more than three alternately switched switches of the charge pump controller to couple to a capacitor wherein the no more than three alternately switched switches are configured to couple the capacitor in a charging configuration during a first time period and to couple the capacitor to supply a current to an LED during a second time period;

configuring the charge pump controller to receive a sense signal that is representative of the current and to regulate the current substantially to a first value; and coupling a current source in series with one switch of the no more than three switches wherein the current source limits a maximum value of the current to no greater than a second value that is greater than the first value.

9. A method of forming a charge pump controller comprising:

configuring no more than three alternately switched switches of the charge pump controller to couple to a capacitor wherein the no more than three alternately switched switches are configured to couple the capacitor in a charging configuration during a first time period and to couple the capacitor to supply a current to an LED during a second time period;

coupling a first switch of the three alternately switched switches between a first output of the charge pump controller and a supply voltage input of the charge pump controller wherein the first output is configured to be coupled to a first terminal of the capacitor and to a first terminal of the LED;

coupling a second switch of the three alternately switched switches between a second output of the charge pump controller and the supply voltage input wherein the second output is configured to be coupled to a second terminal of the capacitor; and coupling a third switch of the three alternately switched switches between the second output and a supply return of the charge pump controller.

* * * * *